US007534191B2

(12) United States Patent
Endo et al.

(10) Patent No.: US 7,534,191 B2
(45) Date of Patent: May 19, 2009

(54) POWER OUTPUT APPARATUS, VEHICLE INCLUDING POWER OUTPUT APPARATUS, AND CONTROL UNIT AND METHOD FOR POWER OUTPUT APPARATUS

(75) Inventors: Hiroatsu Endo, Nagoya (JP); Masashi Yoshimi, Toyota (JP); Shinichi Sasade, Nagoya (JP); Kazuo Kawaguchi, Kasugai (JP); Yoichi Tajima, Anjyo (JP); Shinobu Nishiyama, Toyoake (JP); Kazuomi Okasaka, Nagoya (JP)

(73) Assignees: Toyota Jidosha Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 305 days.

(21) Appl. No.: 11/651,603

(22) Filed: Jan. 10, 2007

(65) Prior Publication Data

US 2007/0179014 A1    Aug. 2, 2007

(30) Foreign Application Priority Data

Feb. 1, 2006    (JP)    ............................. 2006-024802

(51) Int. Cl.
*B60W 10/08*    (2006.01)
(52) U.S. Cl. .............................. 477/5; 477/115; 477/906
(58) Field of Classification Search ...................... 477/5, 477/115, 906
See application file for complete search history.

(56) References Cited

U.S. PATENT DOCUMENTS

| 4,896,569 A | * | 1/1990 | Ito et al. ........................ 477/65 |
| 2007/0129209 A1 | * | 6/2007 | Rouphael et al. .............. 477/34 |

FOREIGN PATENT DOCUMENTS

| JP | 2003-83442 A | | 3/2003 |
| JP | 2003-143707 A | | 5/2003 |
| JP | 2004-10024 A | | 1/2004 |
| JP | 2005-388 A | | 1/2005 |
| JP | 2005329926 A | * | 12/2005 |

* cited by examiner

*Primary Examiner*—Charles A Marmor
*Assistant Examiner*—Erin D Bishop
(74) *Attorney, Agent, or Firm*—Sughrue Mion, PLLC

(57) ABSTRACT

A power output apparatus that suppresses wearing-out of the components of a transmission connected to a drive shaft and a rotating shaft of an electric motor as well as reducing the a shock imparted to the vehicle. The required drive power is output to the drive shaft by appropriately controlling and internal combustion engine, a power split device, the electric motor and a shifting portion. When the rotational speed of the drive shaft can be estimated, the speed ratio in the shifting portion is changed based on either the detected rotational speed of the drive shaft or the estimated rotational speed of the drive shaft and the rotational speed of the rotating shaft. However, when the rotational speed of the drive shaft cannot be estimated, the speed ratio is maintained in the shifting portion.

8 Claims, 10 Drawing Sheets

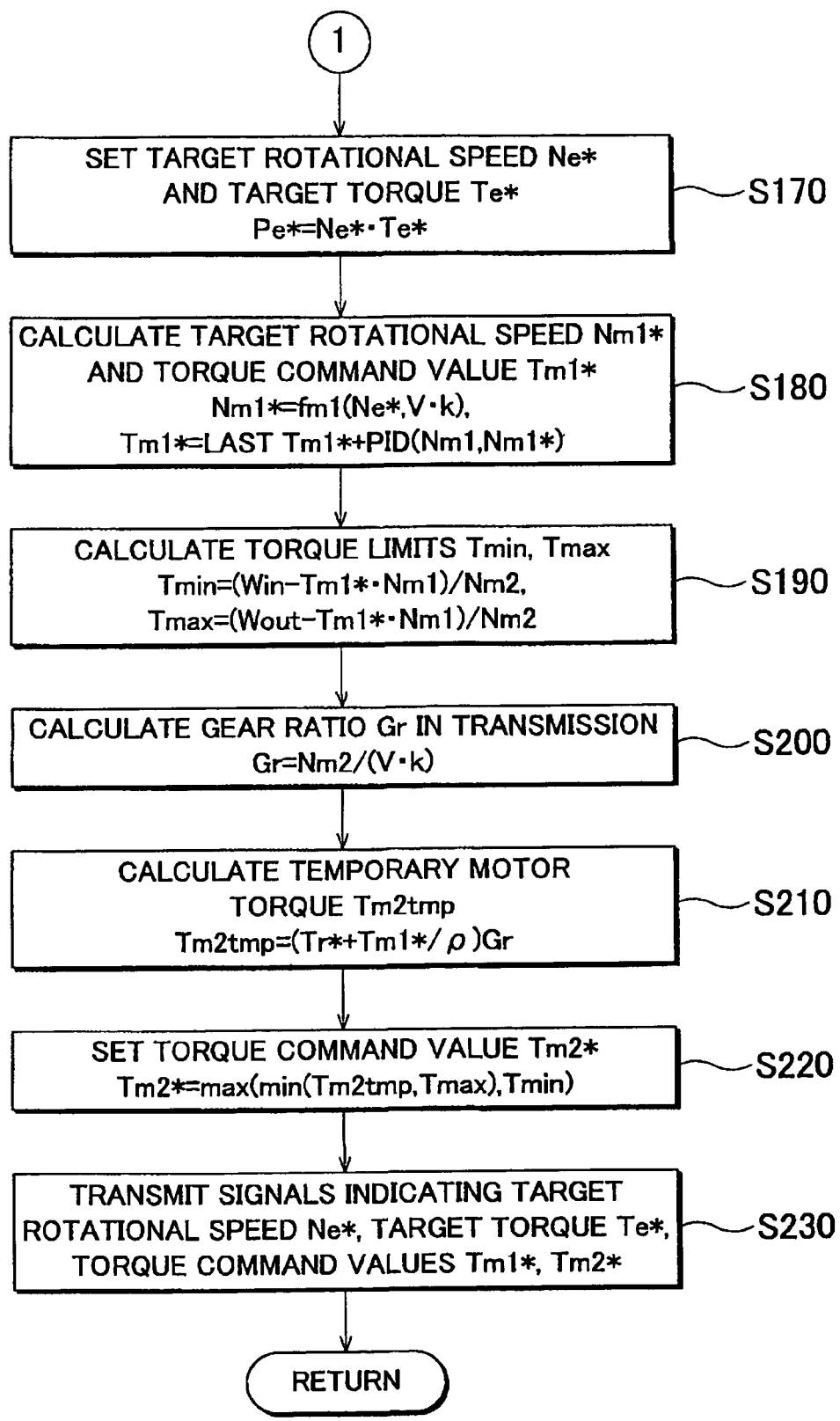

POWER OUTPUT APPARATUS, VEHICLE INCLUDING POWER OUTPUT APPARATUS, AND CONTROL UNIT AND METHOD FOR POWER OUTPUT APPARATUS

INCORPORATION BY REFERENCE

The disclosure of Japanese Patent Application No. 2006-24802 filed on Feb. 1, 2006 including the specification, drawings and abstract is incorporated herein by reference in its entirety.

BACKGROUND OF THE INVENTION

1. Field of the Invention

The invention relates to a power output apparatus, a vehicle including the power output apparatus, and a control unit and method for the power output apparatus.

2. Description of the Related Art

A power output apparatus is described, for example, in Japanese Patent Application Publication No. JP-2003-143707. In the described power output apparatus, an engine, an electric power generator, and an output shaft are connected to a planetary gear unit, and a drive motor is connected to the output shaft. In the power output apparatus, the rotational speed of the drive motor may be calculated by multiple methods. For example, the rotational speed of the drive motor may be calculated based on the rotational speed of the output shaft, the position of the rotor of the drive motor, and the engine speed and the rotational speed of the electric power generator. Thus, the rotational speed of the drive motor is calculated more accurately. As a result, the drive motor is controlled more reliably.

Some power output apparatuses including a transmission, arranged between a drive motor and an output shaft, that performs the shifting operation while outputting power, in addition to an engine, a planetary gear unit, an electric power generator, and the drive motor, make a synchronous determination, in which it is determined whether the engine and the drive motor operate in synchronization with each other, in order to smoothly change the gear ratio in the transmission, based on the rotational speed of the output shaft detected by an output shaft rotational speed sensor or the rotational speed of the output shaft estimated based on the engine speed and the rotational speed of the electric power generator, and the rotational speed of the drive motor. If the gear ratio is changed in the transmission when the rotational speed of the output shaft cannot be estimated, the following inconvenience may occur. For example, if a malfunction in the output shaft rotational speed sensor occurs during the shifting operation, the power output apparatus is unable to make an appropriate synchronous determination. This is because, the appropriate rotational speed of the output shaft can neither be detected by the output shaft rotational speed sensor nor estimated based on the engine speed and the rotational speed of the electric power generator. As a result, the components of the transmission may wear out or a shock may be imparted to the vehicle.

SUMMARY OF THE INVENTION

It is an object of the invention to provide a power output apparatus, a vehicle including the power output apparatus, and a control unit and method for controlling the power output apparatus that make it possible to suppress wearing-out of the components of a transmission connected to a drive shaft and a rotating shaft of an electric motor. It is another object of the invention to provide a power output apparatus, a vehicle including the power output apparatus, and a control unit and method for controlling the power output apparatus that make it possible to suppress a shock imparted to the vehicle.

The following configurations are employed for the power output apparatus, the vehicle including the power output apparatus, and the control unit and method for controlling the power output apparatus in order to achieve at least one of the above-mentioned objects.

A first aspect of the invention relates to a power output apparatus that outputs power to a drive shaft. The power output apparatus includes an internal combustion engine; storage portion; an electric motor that receives and outputs power, and that exchanges electric power with the storage portion; power split portion that is connected to an output shaft of the internal combustion engine and the drive shaft, and that receives power from the output shaft and outputs the power to the drive shaft or receives power from the drive shaft and outputs the power to the output shaft while exchanging electric power with the storage portion and exchanging power with the internal combustion engine; shifting portion for transferring power between a rotating shaft of the electric motor and the drive shaft while changing a speed ratio based on a rotational speed of the rotating shaft of the electric motor and a rotational speed of the drive shaft; engine speed detection portion for detecting an engine speed that is a rotational speed of the output shaft of the internal combustion engine; drive shaft rotational speed detection portion for detecting the rotational speed of the drive shaft; rotating shaft rotational speed detection portion for detecting the rotational speed of the rotating shaft of the electric motor; drive shaft rotational speed estimation portion for estimating the rotational speed of the drive shaft based on the engine speed detected by the engine speed detection portion and a driving state of the power split portion; required drive power setting portion for setting a required drive power required for the drive shaft; and control portion for controlling the internal combustion engine, the power split portion, the electric motor, and the shifting portion to output the required drive power to the drive shaft. The control portion changes the speed ratio in the shifting portion, based on the rotational speed of the drive shaft detected by the drive shaft rotational speed detection portion or the rotational speed of the drive shaft estimated by the drive shaft rotational speed estimation portion, and the rotational speed of the rotating shaft detected by the rotating shaft rotational speed detection portion, when an estimation function is performed properly, that is when the drive shaft rotational speed estimation portion can estimate the rotational speed of the drive shaft. The control portion maintains the speed ratio in the shifting portion, when a malfunction has occurred in the estimation function, that is when the drive shaft rotational speed estimation portion cannot estimate the rotational speed of the drive shaft.

With the power output apparatus according to the first aspect of the invention, when the estimation function is performed properly, that is, when the drive shaft rotational speed estimation portion can estimate the rotational speed of the drive shaft based on the engine speed detected by the engine speed detection portion and the driving state of the power split portion, the internal combustion engine, the power split portion, the electric motor, and the shifting portion are controlled so that drive power corresponding to the required drive power is output to the drive shaft, while the speed ratio is changed in the shifting portion based on the rotational speed of the drive shaft detected by the drive shaft rotational speed detection portion or the rotational speed of the drive shaft estimated by the drive shaft rotational speed estimation portion, and the rotational speed of the rotating shaft detected by the rotating shaft rotational speed detection portion. On the other hand, when a malfunction has occurred in the estimation function, that is, when the drive shaft rotational speed estimation portion cannot estimate the rotational speed of the drive shaft, the internal combustion engine, the power split portion, the electric motor, and the shifting portion are controlled so that the drive power corresponding to the required drive power is output to the drive shaft while the speed ratio is maintained in the shifting portion. Namely, when a malfunction has occurred in the estimation function, control is performed so that the speed ratio is not changed in the shifting portion. If the speed ratio is changed in the shifting portion when a malfunction has occurred in the estimation function, the synchronous determination may not be performed appropriately. This is because, if a malfunction occurs in the drive shaft rotational speed detection portion during the change in speed ratio, the rotational speed can neither be detected by the drive shaft rotational speed detection portion nor estimated by the drive shaft rotational speed estimation portion. As a result, the components of the shifting portion may wear out or a shock may be imparted to the vehicle. However, such inconvenience can be suppressed because the speed ratio is not changed when a malfunction has occurred in the estimation function.

In the power output apparatus according to the first aspect of the invention, when the estimation function is performed properly and a malfunction has not occurred in the drive shaft rotational speed detection portion, the control portion may perform control so that the drive power corresponding to the required drive power is output to the drive shaft while the speed ratio is changed in the shifting portion based on the rotational speed of the drive shaft detected by the drive shaft rotational speed detection portion and the rotational speed of the rotating shaft detected by the rotating shaft rotational speed detection portion. On the other hand, when, the estimation function is performed properly and a malfunction has occurred in the drive shaft rotational speed detection portion, the control portion may perform control so that the drive power corresponding to the required drive power is output to the drive shaft while the speed ratio is changed in the shifting portion based on the rotational speed of the drive shaft estimated by the drive shaft rotational speed estimation portion and the rotational speed of the rotating shaft detected by the rotating shaft rotational speed detection portion. Thus, when the estimation function is performed properly, the speed ratio is changed in the shifting portion regardless of whether the drive shaft rotational speed detection portion is operating properly.

In the power output apparatus according to the first aspect of the invention, when a malfunction has occurred in the engine speed detection portion, the control portion may determine that a malfunction has occurred in the estimation function, and performs control so that the speed ratio is not changed in the shifting portion. Thus, when a malfunction has occurred in the engine speed detection portion and the engine speed cannot be detected, a change in the speed ratio is suppressed in the shifting portion.

In the power output apparatus according to the first aspect of the invention, when the driving state of the power split portion cannot be detected, the control portion may determine that a malfunction has occurred in the estimation function, and perform control so that the speed ratio is not changed in the shifting portion. In this case, the power split portion may include three-axis power reception/output portion that is connected to three shafts that are the output shaft of the internal combustion engine, the drive shaft, and a third shaft, and that receives or outputs, based on power received from and/or output to any two of the three shafts, power from or to the remaining shaft; an electric motor that receives power from or outputs power to the third shaft; and third shaft rotational speed detection portion for detecting a rotational speed of the third shaft. When a malfunction has occurred in the third shaft rotational speed detection portion, the control portion may determine that a malfunction has occurred in the estimation function, and perform control so that the speed ratio is not changed in the shifting portion. Thus, when a malfunction has occurred in the third shaft rotational speed detection portion and the rotational speed of the third shaft cannot be detected, a change in speed ratio is suppressed in the shifting portion.

A second aspect of the invention relates to a vehicle provided with the power output apparatus according to the first aspect of the invention, which outputs power to a drive shaft. In the vehicle, an axle is connected to the drive shaft. The vehicle is provided with the power output apparatus including the internal combustion engine; the storage portion; the electric motor that receives and outputs power, and that exchanges electric power with the storage portion; the power split portion that is connected to the output shaft of the internal combustion engine and the drive shaft, and that receives power from the output shaft and outputs the power to the drive shaft or receives power from the drive shaft and outputs the power to the output shaft while exchanging electric power with the storage portion and exchanging power with the internal combustion engine; the shifting portion for transferring power between the rotating shaft of the electric motor and the drive shaft while changing the speed ratio based on the rotational speed of the rotating shaft of the electric motor and the rotational speed of the drive shaft; the engine speed detection portion for detecting the engine speed that is the rotational speed of the output shaft of the internal combustion engine; the drive shaft rotational speed detection portion for detecting the rotational speed of the drive shaft; the rotating shaft rotational speed detection portion for detecting the rotational speed of the rotating shaft of the electric motor; the drive shaft rotational speed estimation portion for estimating the rotational speed of the drive shaft based on the engine speed detected by the engine speed detection portion and the driving state of the power split portion; the required drive power setting portion for setting the required drive power required for the drive shaft; and the control portion for controlling the internal combustion engine, the power split portion, the electric motor, and the shifting portion to output the required drive power to the drive shaft. The control portion changes the speed ratio in the shifting portion, based on the rotational speed of the drive shaft detected by the drive shaft rotational speed detection portion or the rotational speed of the drive shaft estimated by the drive shaft rotational speed estimation portion, and the rotational speed of the rotating shaft detected by the rotating shaft rotational speed detection portion, when the estimation function is performed properly, that is when the drive shaft rotational speed estimation portion can estimate the rotational speed of the drive shaft. The control portion maintains the speed ratio in the shifting portion, when a malfunction has occurred in the estimation function, that is when the drive shaft rotational speed estimation portion cannot estimate the rotational speed of the drive shaft.

The vehicle according to the second aspect of the invention is provided with the power output apparatus according to the first aspect of the invention. Accordingly, it is possible to obtain the same effects as those produced by the power output apparatus according to the first aspect of the invention. For example, it is possible to suppress occurrence of the inconvenience caused by changing the speed ratio in the shifting portion when it is determined that a malfunction has occurred in the estimation function. Namely, it is possible to suppress wearing-out of the components of the shifting portion or a shock imparted to the vehicle, that may be caused when a malfunction occurs in the drive shaft rotational speed detection portion during a change in the speed ratio.

A third aspect of the invention relates to a control unit for a power output apparatus that includes an internal combustion engine; storage portion; an electric motor that receives and outputs power, and that exchanges electric power with the storage portion; power split portion that is connected to an output shaft of the internal combustion engine and the drive shaft, and that receives power from the output shaft and outputs the power to the drive shaft or receives power from the drive shaft and outputs the power to the output shaft while exchanging electric power with the storage portion and exchanging power with the internal combustion engine; shifting portion for transferring power between a rotating shaft of the electric motor and the drive shaft while changing a speed ratio based on a rotational speed of the rotating shaft of the electric motor and a rotational speed of the drive shaft; engine speed detection portion for detecting an engine speed that is a rotational speed of the output shaft of the internal combustion engine; drive shaft rotational speed detection portion for detecting the rotational speed of the drive shaft; and rotating shaft rotational speed detection portion for detecting the rotational speed of the rotating shaft of the electric motor. The control unit includes drive shaft rotational speed estimation portion for estimating the rotational speed of the drive shaft based on the engine speed detected by the engine speed detection portion and a driving state of the power split portion; required drive power setting portion for setting a required drive power required for the drive shaft; and control portion for controlling the internal combustion engine, the power split portion, the electric motor, and the shifting portion to output the required drive power to the drive shaft. The control portion changes the speed ratio in the shifting portion, based on the rotational speed of the drive shaft detected by the drive shaft rotational speed detection portion or the rotational speed of the drive shaft estimated by the drive shaft rotational speed estimation portion, and the rotational speed of the rotating shaft detected by the rotating shaft rotational speed detection portion, when an estimation function is performed properly, that is when the drive shaft rotational speed estimation portion can estimate the rotational speed of the drive shaft. The control portion maintains the speed ratio in the shifting portion, when a malfunction has occurred in the estimation function, that is when the drive shaft rotational speed estimation portion cannot estimate the rotational speed of the drive shaft.

With the control unit for the power output apparatus according to the third aspect of the invention, when the estimation function is performed properly, that is, when the drive shaft rotational speed estimation portion can estimate the rotational speed of the drive shaft based on the engine speed detected by the engine speed detection portion and the driving state of the power split portion, the internal combustion engine, the power split portion, the electric motor, and the shifting portion are controlled so that drive power corresponding to the required drive power is output to the drive shaft while the speed ratio is changed in the shifting portion based on the rotational speed of the drive shaft detected by the drive shaft rotational speed detection portion or the rotational speed of the drive shaft estimated by the drive shaft rotational speed estimation portion, and the rotational speed of the rotating shaft detected by the rotating shaft rotational speed detection portion. On the other hand, when a malfunction has occurred in the estimation function, that is, when the drive shaft rotational speed estimation portion cannot estimate the rotational speed of the drive shaft, the internal combustion engine, the power split portion, the electric motor, and the shifting portion are controlled so that the drive power corresponding to the required drive power is output to the drive shaft while the speed ratio is maintained in the shifting portion. Namely, when a malfunction has occurred in the estimation function, control is performed so that the speed ratio is not changed in the shifting portion. If the speed ratio is changed in the shifting portion when a malfunction has occurred in the estimation function, the synchronous determination may not be performed appropriately. This is because, if a malfunction occurs in the drive shaft rotational speed detection portion during the change in speed ratio, the rotational speed can neither be detected by the drive shaft rotational speed detection portion nor estimated by the drive shaft rotational speed estimation portion. As a result, the components of the shifting portion may wear out or a shock may be imparted to the vehicle. However, such inconvenience can be suppressed because the speed ratio is not changed when a malfunction has occurred in the estimation function.

A fourth aspect of the invention relates to a control method for a power output apparatus that includes an internal combustion engine; storage portion; an electric motor that receives and outputs power, and that exchanges electric power with the storage portion; power split portion that is connected to an output shaft of the internal combustion engine and the drive shaft, and that receives power from the output shaft and outputs the power to the drive shaft or receives power from the drive shaft and outputs the power to the output shaft while exchanging electric power with the storage portion and exchanging power with the internal combustion engine; shifting portion for transferring power between a rotating shaft of the electric motor and the drive shaft while changing a speed ratio based on a rotational speed of the rotating shaft of the electric motor and a rotational speed of the drive shaft; engine speed detection portion for detecting an engine speed that is a rotational speed of the output shaft of the internal combustion engine; drive shaft rotational speed detection portion for detecting the rotational speed of the drive shaft; and rotating shaft rotational speed detection portion for detecting the rotational speed of the rotating shaft of the electric motor. According to the control method, the rotational speed of the drive shaft is estimated based on the engine speed detected by the engine speed detection portion and a driving state of the power split portion; and a required drive power required for the drive shaft is set. Then, when an estimation function is performed properly, that is when the rotational speed of the drive shaft can be estimated, the internal combustion engine, the power split portion, the electric motor, and the shifting portion are controlled to output the required drive power to the drive shaft, while the speed ratio is changed in the shifting portion based on the rotational speed of the drive shaft detected by the drive shaft rotational speed detection portion or the estimated rotational speed of the drive shaft, and the rotational speed of the rotating shaft detected by the rotating shaft rotational speed detection portion. On the other hand, when a malfunction has occurred in the estimation function, that is when the rotational speed of the drive shaft cannot be estimated, the internal combustion engine, the power split portion, the electric motor, and the shifting portion are controlled to output the required drive power to the drive shaft, while the speed ratio is maintained in the shifting portion.

With the control method according to the fourth aspect of the invention, when the estimation function is performed properly, that is, when the rotational speed of the drive shaft can be estimated based on the engine speed detected by the engine speed detection portion and the driving state of the power split portion, the internal combustion engine, the power split portion, the electric motor, and the shifting portion are controlled so that drive power corresponding to the required drive power is output to the drive shaft while the speed ratio is changed in the shifting portion based on the rotational speed of the drive shaft detected by the drive shaft rotational speed detection portion or the estimated rotational speed of the drive shaft, and the rotational speed of the rotating shaft detected by the rotating shaft rotational speed detection portion. On the other hand, when a malfunction has occurred in the estimation function, that is, when the rotational speed of the drive shaft cannot be estimated, the internal combustion engine, the power split portion, the electric motor, and the shifting portion are controlled so that the drive power corresponding to the required drive power is output to the drive shaft while the speed ratio is maintained in the shifting portion. Namely, when a malfunction has occurred in the estimation function, control is performed so that the speed ratio is not changed in the shifting portion. If the speed ratio is changed in the shifting portion when a malfunction has occurred in the estimation function, the synchronous determination may not be performed appropriately. This is because, if a malfunction occurs in the drive shaft rotational speed detection portion during the change in speed ratio, the rotational speed can neither be detected by the drive shaft rotational speed detection portion nor estimated. As a result, the components of the shifting portion may wear out or a shock may be imparted to the vehicle. However, such inconvenience can be suppressed because the speed ratio is not changed when a malfunction has occurred in the estimation function.

BRIEF DESCRIPTION OF THE DRAWINGS

The forgoing and further objects, features and advantages of the invention will become apparent from the following description of an example embodiment with reference to the accompanying drawings, wherein the same or corresponding portions will be denoted by the same reference numerals and wherein:

FIGS. 3A and 3B are the flowcharts showing an example of the drive control routine performed by an electronic control unit 70 mounted in the hybrid vehicle 20 according to the embodiment of the invention;

DETAILED DESCRIPTION OF THE EXAMPLE EMBODIMENT

Hereafter, an example embodiment of the invention will be described with reference to accompanying drawings.

Figure 1:
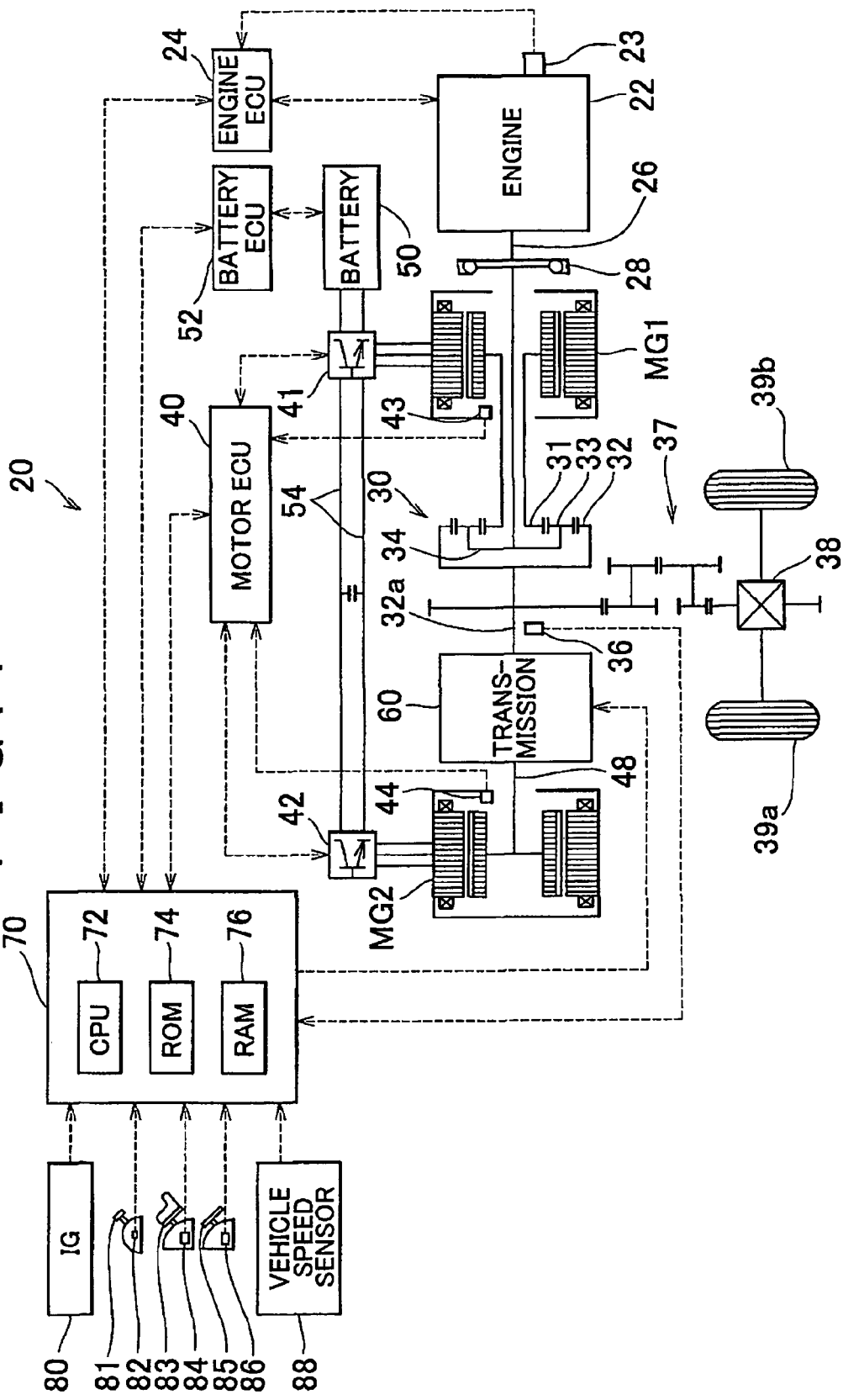
FIG. 1 is the view schematically showing the structure of a hybrid vehicle 20 including a power output apparatus according to an embodiment of the invention.

FIG. 1 is the view schematically showing the structure of a hybrid vehicle 20 including a power output apparatus according to an embodiment of the invention. As shown in FIG. 1, the hybrid vehicle 20 includes an engine 22; a three-axis power split/integration mechanism 30 that is connected via a damper 28 to a crankshaft 26 serving as the output shaft of the engine 22; a motor MG1 that is connected to the power split/integration mechanism 30 and that can generate electric power; a motor MG2 that is connected to the power split/integration mechanism 30 via a transmission 60; and an electronic control unit for a hybrid vehicle (hereinafter, referred to as a "hybrid ECU) 70 that controls the entirety of the hybrid vehicle 20.

The engine 22 is an internal combustion engine that outputs power using hydrocarbon fuel such as gasoline and diesel oil. An engine electronic control unit (hereinafter, referred to as an "engine ECU") 24 performs the operation controls on the engine 22, for example, the fuel injection control, the ignition control, and the intake air amount adjustment control. The engine ECU 24 receives signals from various sensors that detect the operational state of the engine 22. The engine ECU 24 receives signals from, for example, a crank position sensor 23 attached to the crankshaft 26. The engine ECU 24 communicates with the hybrid ECU 70. The engine ECU 24 controls the operation of the engine 22 based on the control signals from the hybrid ECU 70. The engine ECU 24 transmits the data concerning the operational state of the engine 22 to the hybrid ECU 70 when needed.

The power split/integration mechanism 30 is formed of a planetary gear set that includes a sun gear 31 formed of an external gear; a ring gear 32 formed of an internal gear and provided coaxially with the sun gear 31; multiple pinions 33 meshed with the sun gear 31 and the ring gear 32; and a carrier 34 that supports the multiple pinions 33 such that the pinions 33 can rotate on their axes and move around the sun gear 31. The planetary gear set changes the rotational speeds among the rotational elements, that are, the sun gear 31, the ring gear 32, and the carrier 34. In the power split/integration mechanism 30, the crankshaft 26 of the engine 22 is connected to the carrier 34, the motor MG1 is connected to the sun gear 31, and the transmission 60 is connected to the ring gear 32 via a ring gear shaft 32a. When the motor MG1 serves as an electric power generator, the power split/integration mechanism 30 distributes the power, output from the engine 22 to the carrier 34, between the sun gear 31 and the ring gear 32 based on the gear ratio therebetween. When the motor MG1 serves as an electric motor, the power split/integration mechanism 30 integrates the power, output from the engine 22 to the carrier 34, and the power, output from the motor MG1 to the sun gear 31. Then, the power split/integration mechanism 30 outputs the integrated power to the ring gear 32. The power output to the ring gear 32 is output from the ring gear shaft 32a to drive wheels 39a, 39b via a gear mechanism 37 and a differential gear unit 38.

Each of the motor MG1 and the motor MG2 is formed of a known synchronous generator-motor that can serve as an electric power generator as well as an electric motor. The motors MG1, MG2 exchange electric power with a battery 50 via inverters 41, 42, respectively. An electric power line 54 that connects the inverters 41, 42 to the battery 50 is formed of a positive bus-bar and a negative bus-bar that are shared by the inverters 41, 42. The electric power generated by one of the motors MG1, MG2 may be consumed by the other of the motors MG1, MG2. Accordingly, the motors MG1, MG2 may generate electric power to be supplied to the battery 50, or, alternatively, the battery may discharge the electric power to compensate for a shortfall in the electric power in the motors MG1, MG2. If the electric power balance is maintained between the motor MG1 and the motor MG2, the battery 50 is not supplied with electric power or does not discharge the electric power to the motors MG1, MG2. The motors MG1, MG2 are both controlled by an electronic control unit for a motor (hereinafter, referred to as a "motor ECU") 40. The motor ECU 40 receives the signals necessary to control the motors MG1, MG2, for example, the signals from rotational position sensors 43, 44 that detect the rotational positions of the rotors of the motors MG1, MG2, respectively, and the signals indicating the phase currents that are applied to the motors MG1, MG2, and that are detected by current sensors (not shown). The motor ECU 40 transmits the switching control signals to the inverters 41, 42.

The motor ECU 40 calculates the rotational speeds Nm1, Nm2 of the rotors of the motors MG1, MG2 based on the signals received from the rotational position sensors 43, 44, respectively, according to the rotational speed calculation routine (not shown). The motor ECU 40 communicates with the hybrid ECU 70. The motor ECU 40 controls the motors MG1, MG2 based on the control signals from the hybrid ECU 70, and transmits the data concerning the operational states of the motors MG1, MG2 to the hybrid ECU 70.

Figure 2:
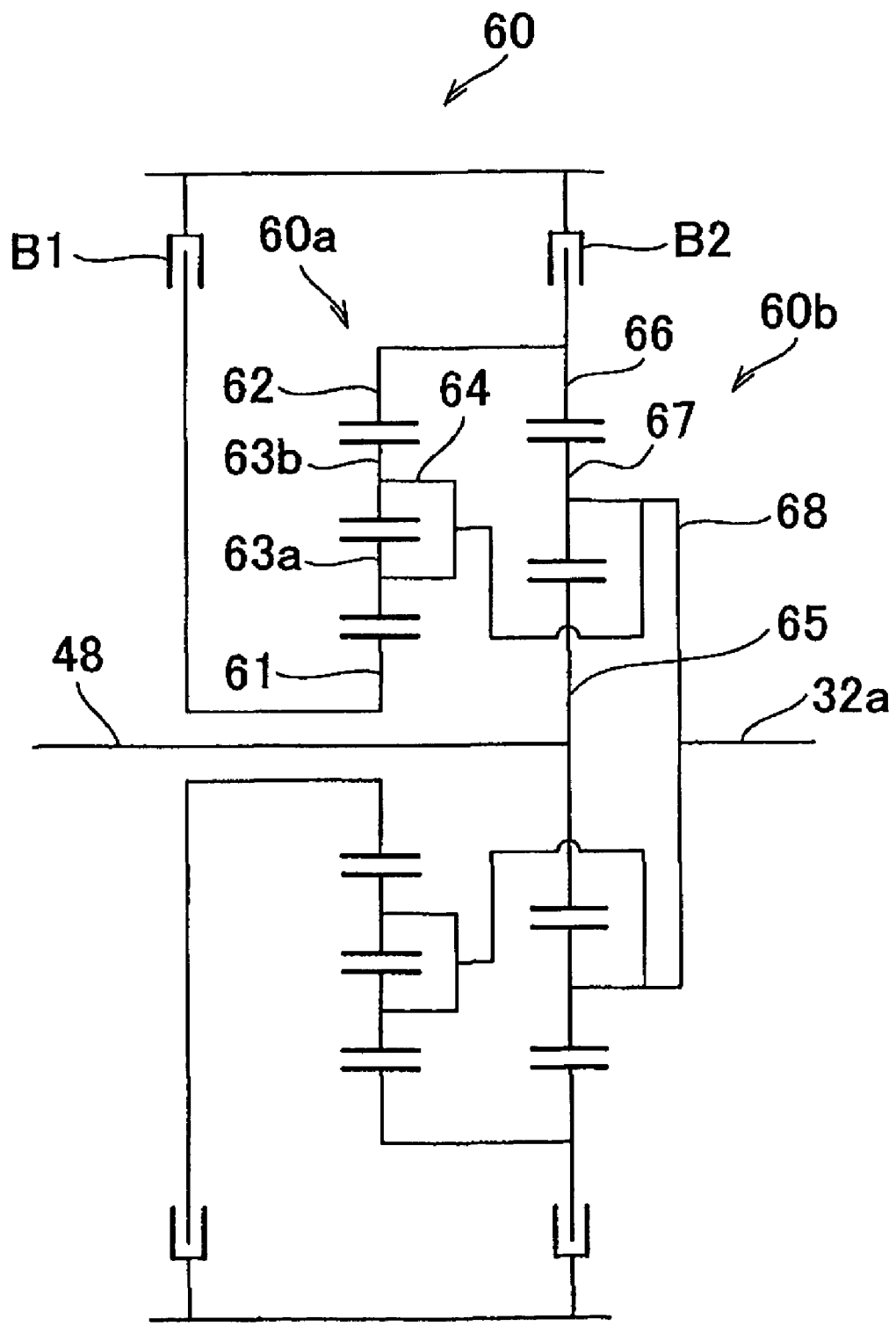
FIG. 2 is the view schematically showing the structure of a transmission 60.

The transmission 60 is arranged between a rotating shaft 48 of the motor MG2 and the ring gear shaft 32a and connects/disconnects the rotating shaft 48 and the ring gear shaft 32a to/from each other. When the rotating shaft 48 and the ring gear shaft 32 are connected to each other via the transmission 60, the transmission 60 can reduce the rotational speed of the rotating shaft 48 of the motor MG2 into one of two rotational speeds, and output the rotation having the reduced rotational speed to the ring gear shaft 32a. FIG. 2 shows an example of the structure of the transmission 60. The transmission 60 shown in FIG. 2 includes a double-pinion planetary gear set 60a, a single pinion planetary gear set 60b, and two brakes B1, B2.

The double pinion planetary gear set 60a includes a sun gear 61 that is formed of an external gear; a ring gear 62 that is formed of an internal gear provided coaxially with the sun gear 61; multiple first pinions 63a meshed with the sun gear 61; multiple second pinions 63b meshed with the first pinions 63a as well as the ring gear 62; and a carrier 64 that supports the first pinions 63a and the second pinions 63b such that the first pinions 63a are meshed with the respective second pinions 63b and they can rotate on their axes and move around the sun gear 61. Rotation of the sun gear 61 is permitted/stopped by releasing/applying the brake B1. The single pinion planetary gear set 60b includes a sun gear 65 that is formed of an external gear; a ring gear 66 that is formed of an internal gear provided coaxially with the sun gear 65; multiple pinions 67 meshed with the sun gear 65 as well as the ring gear 66; and a carrier 68 that supports the pinions 67 such that the pinions 67 can rotate on their axes and move around the sun gear 65. The sun gear 65 is connected to the rotating shaft 48 of the motor MG2. The carrier 68 is connected to the ring gear shaft 32a. Rotation of the ring gear 66 is permitted/stopped by releasing/applying the brake B2.

The double pinion planetary gear set 60a and the single pinion planetary gear set 60b are connected to each other via the ring gear 62, the ring gear 66, the carrier 64, and the carrier 68. In the transmission 60, the rotating shaft 48 of the motor MG2 is disconnected from the ring gear shaft 32a by releasing both of the brakes B1, B2. When the brake B1 is released and the brake B2 is applied, the rotational speed of the rotating shaft 48 of the motor MG2 is reduced at a relatively large speed reduction ratio, and the rotation having the reduced rotational speed is output to the ring gear shaft 32a (hereinafter, such a state will be referred to as the "low gear state"). When the brake B1 is applied and the brake B2 is released, the rotational speed of the rotating shaft 48 of the motor MG2 is reduced at a relatively small speed reduction ratio, and the rotation having the reduced rotational speed is output to the ring gear shaft 32a (hereinafter, such a state will be referred to as the "high gear state"). When the brakes B1, B2 are both applied, rotations of the rotating shaft 48 and the ring gear shaft 32a are prohibited. In the embodiment of the invention, application and release of the brakes B1, B2 are controlled by controlling the hydraulic pressures that are applied to the brakes B1, B2 by driving hydraulic actuators (not shown).

The battery 50 is controlled by an electronic control unit for a battery (hereinafter, referred to as a "battery ECU") 52. The battery ECU 52 receives the signals necessary to control the battery 50, for example, the signal indicating the voltage detected between the terminals of the battery 50, which is transmitted from a voltage sensor (not shown) provided between the terminals of the battery 50, the signals indicating the electric currents supplied to/discharged from the battery, which are transmitted from a current sensor (not shown) attached to the electric power line 54 connected to the output terminal of the battery 50, and the signal indicating the battery temperature Tb, which is transmitted from a temperature sensor (not shown) attached to the battery 50. The battery ECU 52 transmits, when needed, the data concerning the condition of the battery 50 to the hybrid ECU 70. To control the battery 50, the battery ECU 52 calculates the state of charge (SOC) based on the value, which the current sensor has obtained by accumulating the amounts of electric currents supplied to/discharged from the battery 50.

The hybrid ECU 70 is formed of a microprocessor mainly including a CPU 72. The hybrid ECU 70 includes ROM 74 that stores the processing programs, RAM 76 that temporarily stores the data, an input port (not shown), an output port (not shown), and a communication port (not shown), in addition to the CPU 72. The hybrid ECU 70 receives, via the input port, the signal indicating the rotational speed of the ring gear shaft 32a serving as the drive shaft, which is transmitted from a rotational speed sensor 36 (hereinafter, referred to as the "detected rotational speed Nrde"), the ignition signal from an ignition switch 80, the signal indicating the shift position SP from a shift position sensor 82 that detects the position of a shift lever 81, the signal indicating the accelerator pedal operation amount Acc detected by an accelerator pedal position sensor 84, corresponding to the amount by which an accelerator pedal 83 is depressed, the signal indicating the brake pedal position BP detected by a brake pedal position sensor 86, corresponding to the amount by which a brake pedal 85 is depressed, and the signal indicating the vehicle speed V from a vehicle speed sensor 88. The hybrid ECU 70 transmits, for example, the drive signals to the actuators (not shown) for the brakes B1, B2 of the transmission 60.

As described above, the hybrid ECU 70 is connected to the engine ECU 24, the motor ECU 40, and the battery ECU 52 via the communication port. The hybrid ECU 70 exchanges various control signals and data with the engine ECU 24, the motor ECU 40, and the battery ECU 52.

In the hybrid vehicle 20 thus configured according to the embodiment of the invention, the required torque that should be output to the ring gear shaft 32a is calculated based on the accelerator pedal operation amount Acc corresponding to the amount by which the accelerator pedal 83 is depressed by the driver and the vehicle speed V. Then, the engine 22, the motor MG1, and the motor MG2 are controlled so that the required power corresponding to the required torque is output to the ring gear shaft 32*a*.

The operation control of the engine 22, the motor MG1, and the motor MG2 includes the torque conversion operation mode, the electric power supply/discharge operation mode, and the motor operation mode. In the torque conversion operation mode, the engine 22 is controlled so that the power corresponding to the required power is output from the engine 22, and the motors MG1, MG2 are controlled so that the entire power output from the engine 22 undergoes torque conversion by the power split/integration mechanism 30, the motor MG1 and the motor MG2 and is then output to the ring gear shaft 32*a*. In the electric power supply/discharge operation mode, the engine 22 is controlled so that the power corresponding to the value, which is obtained by adding the electric power to be supplied to the battery 50 to the required power or which is obtained by subtracting the electric power to be discharged from the battery 50 from the required power, is output from the engine 22. Also, the motors MG1, MG2 are controlled so that the entire or part of power, which is output from the engine 22 based on the amount of electric power supplied to or discharged from the battery 50, undergoes torque conversion by the power split/integration mechanism 30, the motor MG1, and the motor MG2, and the required power is output to the ring gear shaft 32*a*. In the motor operation mode, the operation control is performed so that the engine 22 is stopped and the power corresponding to the required power from the motor MG2 is output to the ring gear shaft 32*a*.

Figure 3A:
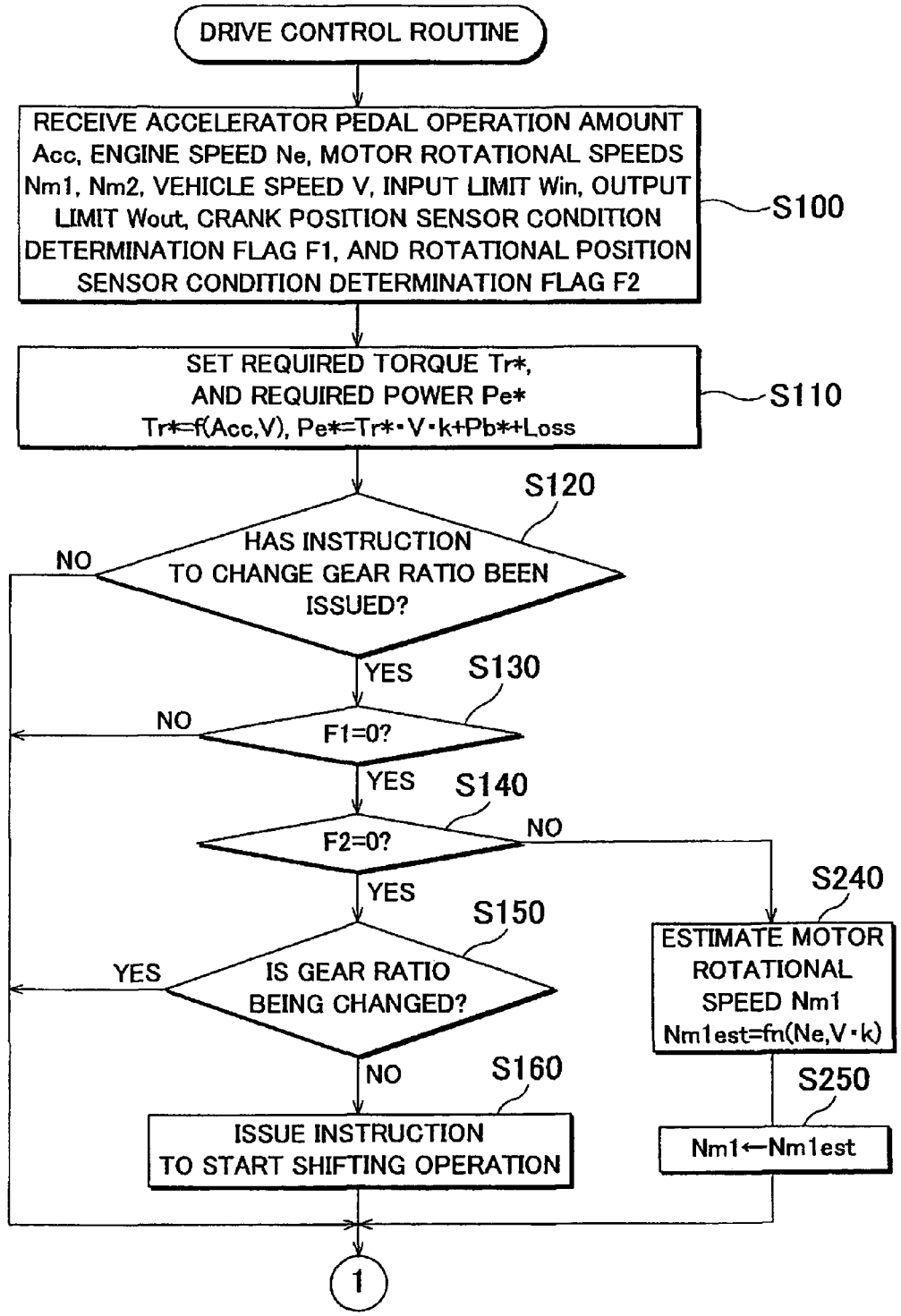

Next, the operation of the thus configured hybrid vehicle 20 will be described. FIG. 3 is the flowchart showing an example of the drive control routine performed by the hybrid ECU 70. The routine is performed at predetermined time intervals of, for example, several milliseconds.

In the drive control routine, first, the CPU 72 of the hybrid ECU 70 receives the data necessary to perform the drive control. Namely, the CPU 72 receives the signal indicating the accelerator pedal operation amount Acc from the accelerator pedal position sensor 84, the signal indicating the vehicle speed V from the vehicle speed sensor 88, the signal indicating the rotational speed Ne of the engine 22, the signals indicating the rotational speeds Nm1, Nm2 of the motors MG1, MG2, the signals indicating the input limit Win and the output limit Wout for the battery 50, the crank position sensor condition determination flag F1 that indicates whether the crank position sensor 23 is operating properly and is able to detect the position of the crankshaft of the engine 22, and the rotational position sensor condition determination flag F2 that indicates whether the rotational position sensor 43 is operating properly and is able to detect the rotational position of the rotor of the motor MG1 (step S100). The rotational speed Ne of the engine 22 is calculated based on the signal from the crank position sensor 23 attached to the crankshaft 26, and the calculated rotational speed Ne is transmitted from the engine ECU 24 to the hybrid ECU 70.

The rotational speeds Nm1, Nm2 of the motors MG1, MG2, respectively, are calculated based on the rotational positions of the rotors of the motors MG1, MG2 detected by the rotational position sensors 43, 44, respectively, and the calculated rotational speeds Nm1, Nm2 are transmitted from the motor ECU 40 to the hybrid ECU 70. In addition, the output limit Wout for the battery 50 is set based on the battery temperature Tb detected by the temperature sensor (not shown), and the state of charge (SOC) of the battery 50, and the calculated output limit Wout is transmitted from the battery ECU 52 to the hybrid ECU 70.

The crank position sensor condition determination routine (not shown) is performed by the engine ECU 24 to determine, for example, whether transmission of the signal from the crank position sensor 23 to the engine ECU 24 has been stopped for a predetermined time period. If it is determined that the crank position sensor 23 is operating properly, the value of the crank position sensor condition determination flag F1 is set to "0". On the other hand, if it is determined that a malfunction has occurred in the crank position sensor 23, the value of the crank position sensor condition determination flag F1 is set to "1". The crank position sensor condition determination flag F1 indicating "0" or "1" is transmitted from the engine ECU 24 to the hybrid ECU 70. The rotational speed sensor condition determination routine (not shown) is performed by the motor ECU 40 to determine, for example, whether transmission of the signal from the rotational position sensor 43 to the motor ECU 40 has been stopped for a predetermined time period. If it is determined that the rotational position sensor 43 is operating properly, the value of the rotational position sensor condition determination flag F2 is set to "0". On the other hand, if it is determined that a malfunction has occurred in the rotational position sensor 43, the value of the rotational position sensor condition determination flag F2 is set to "1". The rotational position sensor condition determination flag F2 indicating "0" or "1" is transmitted from the motor ECU 40 to the hybrid ECU 70.

When the crank position sensor condition determination flag F1 indicates "1", the signal indicating the rotational speed Ne of the engine 22 is not input in the hybrid ECU 70. When the rotational position sensor condition determination flag F2 indicates "1", the signal indicating the rotational speed Nm1 of the motor MG1 is not input in the hybrid ECU 70.

After receiving the data, the hybrid ECU 70 sets the required torque Tr* to be output to the ring gear shaft 32*a* connected to the drive wheels 39*a*, 39*b* and the required power Pe* required for the vehicle, as the torque required for the vehicle, based on the received accelerator pedal operation amount Acc and vehicle speed V (step S110). In the embodiment of the invention, the relationship among the accelerator pedal operation amount Acc, the vehicle speed V and the required torque Tr* is set in advance and stored in the ROM 74 as the required torque-setting map. The required torque Tr* is derived from the map, using the accelerator pedal operation amount Acc and the vehicle speed V.

Figure 4:
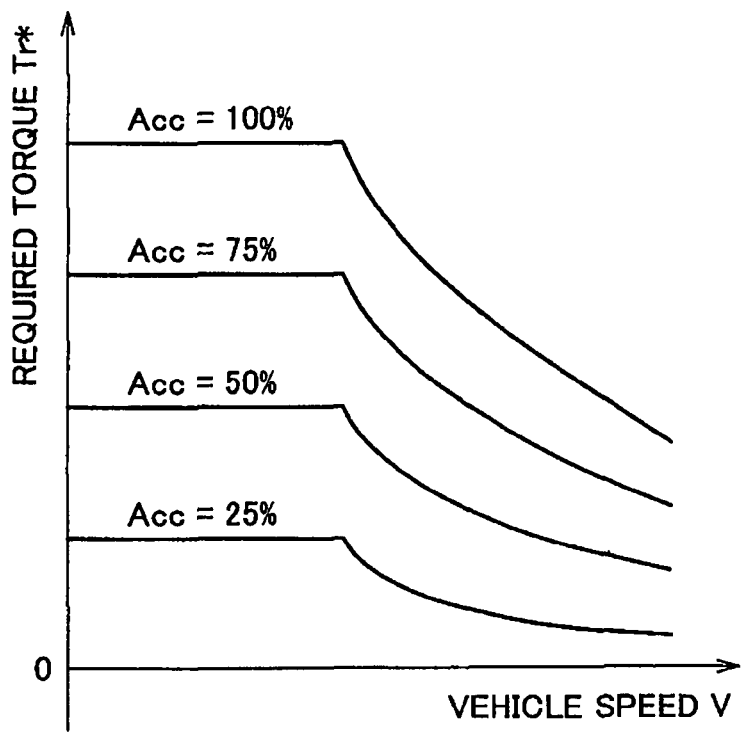
FIG. 4 is the graph showing an example of the map used to set the required torque.

FIG. 4 shows an example of the required torque-setting map. The required power Pe* is obtained by adding the value, obtained by multiplying the required torque Tr* by the rotational speed of the ring gear shaft 32*a*, the required supply/discharged power Pb* required for the battery 50, and the loss Loss. In this routine, the rotational speed of the ring gear shaft 32*a* is obtained by multiplying the vehicle speed V by the conversion coefficient "k".

Figure 5:
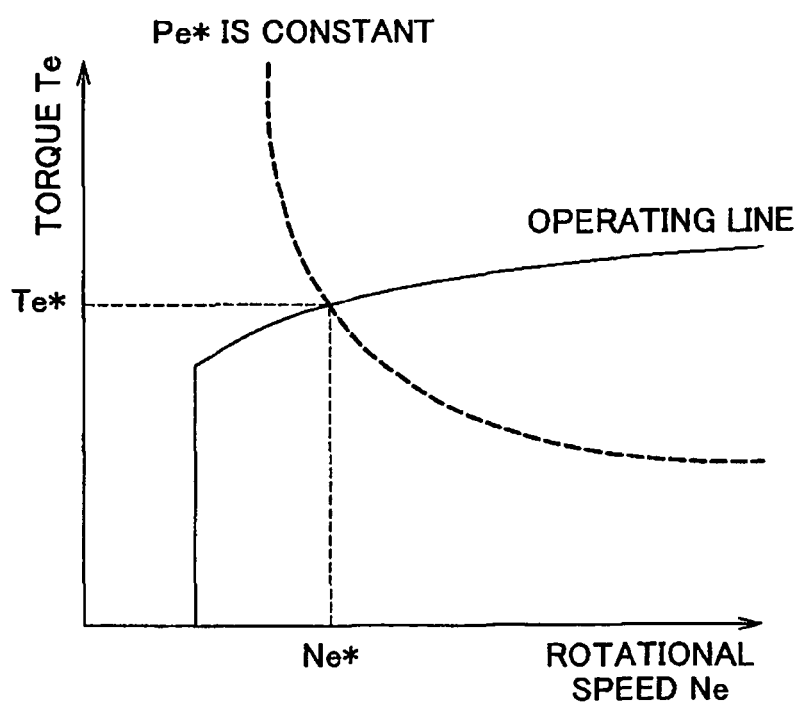
FIG. 5 is the graph showing an example of the operation line of an engine 22, and the manner in which the target rotational speed Ne* and the target torque Te* are set.

Next, it is determined whether an instruction to change the gear ratio in the transmission 60 has been issued (step S120). In the embodiment of the invention, an instruction to change the gear ratio in the transmission 60 is issued at a time set in advance based on the required torque Tr* and the vehicle speed V. If it is determined that an instruction to change the gear ratio in the transmission 60 has not been issued, the target rotational speed Ne* and the target torque Te* for the engine 22 are set based on the required power Pe* (step S170). The target rotational speed Ne* and the target torque Te* are set based on the operation line, on which the engine 22 is efficiently operated, and the required power Pe*. FIG. 5 shows an example of the operation line for the engine 22, and the manner in which the target rotational speed Ne* and the target torque Te* are set. As shown in FIG. 5, the target rotational speed Ne* and the target torque Te* are obtained using the point of intersection of the operation line and the curve on which the required power Pe* (Ne*×Te*) is maintained constant.

When the target rotational speed Ne* and the target torque Te* for the engine 22 are set, the target rotational speed Nm1* for the motor MG1 is calculated according to the following equation (1) based on the target rotational speed Ne* for the engine 22, the rotational speed of the ring gear shaft 32a (V×k), and the gear ratio ρ of the power split/integration mechanism 30. Also, the torque command value Tm1* for the motor MG1 is calculated according to the equation (2) based on the target rotational speed Nm1* and the current rotational speed Nm1 (step S180). The equation (1) is the dynamic equation concerning the rotational elements of the power split/integration mechanism 30.

Figure 6:
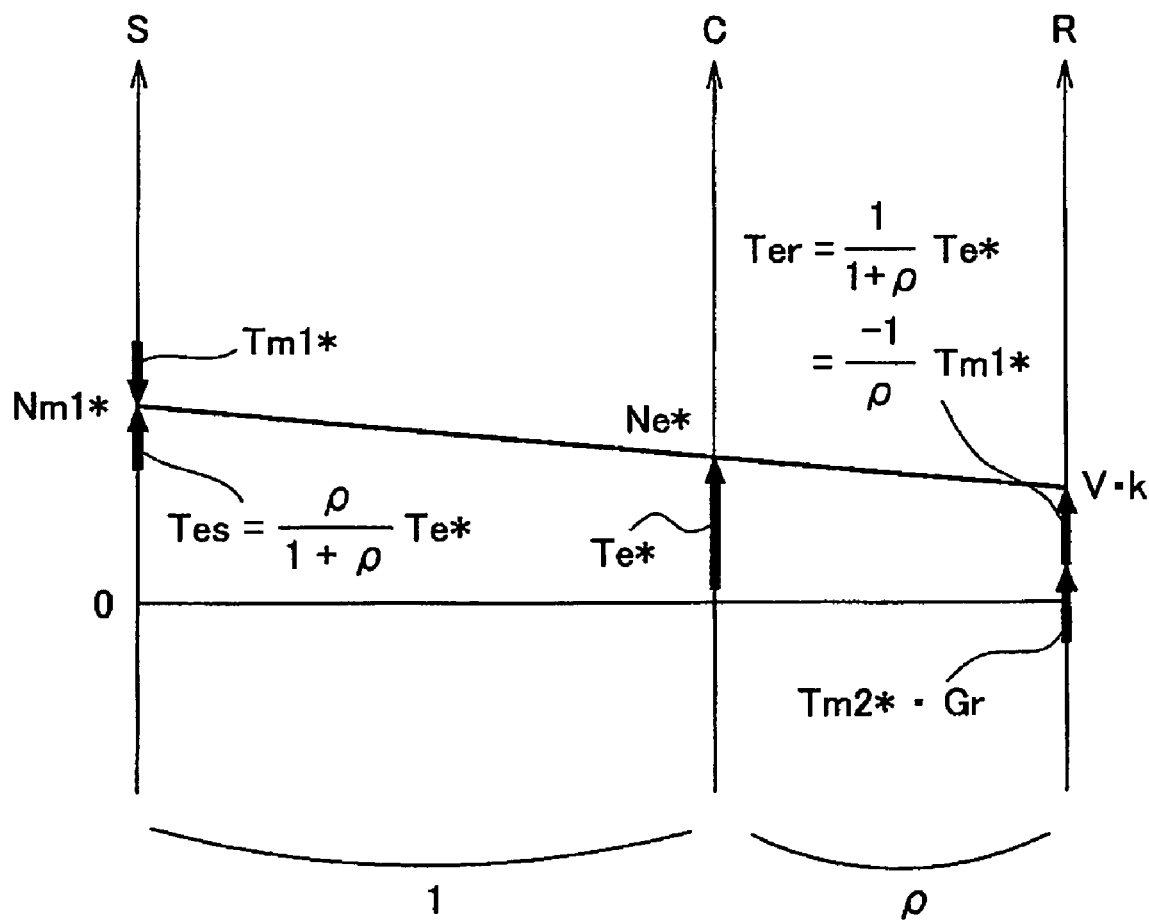
FIG. 6 is the graph showing an example of a collinear view used to describe the rotational elements of a power split/integration mechanism 30 from the dynamic viewpoint.

FIG. 6 shows the collinear view indicating the dynamic relationship between the rotational speed and the torque in the rotational elements of the power split/integration mechanism 30. In FIG. 6, the S axis indicates the rotational speed of the sun gear 31 that is the rotational speed Nm1 of the motor MG1, the C axis indicates the rotational speed of the carrier 34 that is the rotational speed Ne of the engine 22, and the R axis indicates the rotational speed (V×k) of the ring gear 32 (the ring gear shaft 32a). The equation (1) can be easily derived from the collinear view.

One of the two heavy arrows on the R axis indicates the torque, which is output to the ring gear shaft 32a, in the torque Te*, which is output from the engine 22 when the engine 22 is normally operated at the operation point at which the target rotational speed Ne* and the target torque Te* for the engine 22 are achieved. The other heavy arrow on the R axis indicates the torque, which is applied to the ring gear shaft 32a via the transmission 60, in the torque Tm2* output from the motor MG2. The equation (2) is used in the feedback control for rotating the motor MG1 at the target rotational speed Nm1*. In the equation (2), "k1" in the second term on the right side is the gain in the proportional term, and "k2" in the third term on the right side is the gain in the integral term.

$$Nm1^* = Ne^* \times (1+\rho)/\rho - V \times k/\rho \tag{1}$$

$$Tm1^* = \text{last}Tm1^* + k1(Nm1^* - Nm1) + k2 \int (Nm1^* - Nm1)dt \tag{2}$$

After the target rotational speed Nm1* and the command value Tm1* for the motor MG1 are calculated, the torque limits Tmin, Tmax, which are the lower and upper limits of the torque that can be output from the motor MG2, are calculated according to the following equations (3) and (4), respectively. In the equations (3) and (4), the torque limits Tmin, Tmax are calculated by dividing, by the rotational speed Nm2 of the motor MG2, the deviations of the input limit Win and the output limit Wout for the battery 50 from the electric power consumed (generated) by the motor MG1, which is calculated by multiplying the torque command value Tm1* for the motor MG1 by the current rotational speed Nm1 of the motor MG1, respectively (step S190). Then, the gear ratio Gr currently used in the transmission 60 is calculated by dividing the rotational speed Nm2 of the motor MG2 by the rotational speed of the ring gear shaft 32a (V×k) (step S200). The temporary motor torque Tm2tmp, which is the torque to be output from the motor MG2, is calculated according to the equation (5) based on the current gear ratio Gr, the required torque Tr*, the torque command value Tm1*, and the gear ratio ρ of the power split/integration mechanism 30 (step S210). The torque command value Tm2* for the motor MG2 is set to the value obtained by limiting the temporary motor torque Tm2tmp using the torque limits Tmin, Tmax (step S220). Setting the torque command value Tm2* for the motor MG2 makes it possible to set the required toque Te* to be output to the ring gear shaft 32a to the torque limited within the range between the input limit Win and the output limit Wout for the battery 50. The equation (5) can be easily derived from the collinear view in FIG. 6.

$$Tmin = (Win - Tm1^* \times Nm1)/Nm2 \tag{3}$$

$$Tmax = (Wout - Tm1^* \times Nm1)/Nm2 \tag{4}$$

$$Tm2tmp = (Tr^* + Tm1^*/\rho)/Gr \tag{5}$$

After the target rotational speed Ne* and the target torque Te* for the engine 22, and the torque command values Tm1*, Tm2* for the motors MG1, MG2 are set, the signals indicating the target rotational speed Ne* and the target torque Te* for the engine 22 are transmitted to the engine ECU 24, and the signals indicating the torque command values Tm1*, Tm2* for the motors MG1, MG2 are transmitted to the motor ECU 40 (step S230), after which the drive control routine ends. After receiving signals indicating the target rotational speed Ne* and the target torque Te*, the engine ECU 24 performs the controls of the engine 22, for example, the fuel injection control and the ignition control so that the engine 22 is operated at the operation point at which the target rotational speed Ne* and the target torque Te* are achieved. After receiving the signals indicating the torque command values Tm1*, Tm2*, the motor ECU 40 performs the switching control on the switching elements of the inverters 41, 42 so that the motor MG1 is driven based on the torque command value Tm1* and the motor MG2 is driven based on the torque command value Tm2*.

If it is determined in step S120 that an instruction to change the gear ratio in the transmission 60 has been issued, the hybrid ECU 70 checks the value of the crank position sensor condition determination flag F1 (step S130), and the value of the rotational position sensor condition determination flag F2 (step S140). The value of the crank position sensor condition determination flag F1 and the value of the rotational position sensor condition determination flag F2 are checked in order to determine whether it is possible to calculate the rotational speed of the ring gear shaft 32a based on the rotational speed Ne and the rotational speed Nm1 (hereinafter, the rotational speed calculated based on the rotational speed Ne of the engine 22 and the rotational speed Nm1 of the motor MG1 will be referred to as the "estimated rotational speed Nrest), as will be described later.

Figure 7A:
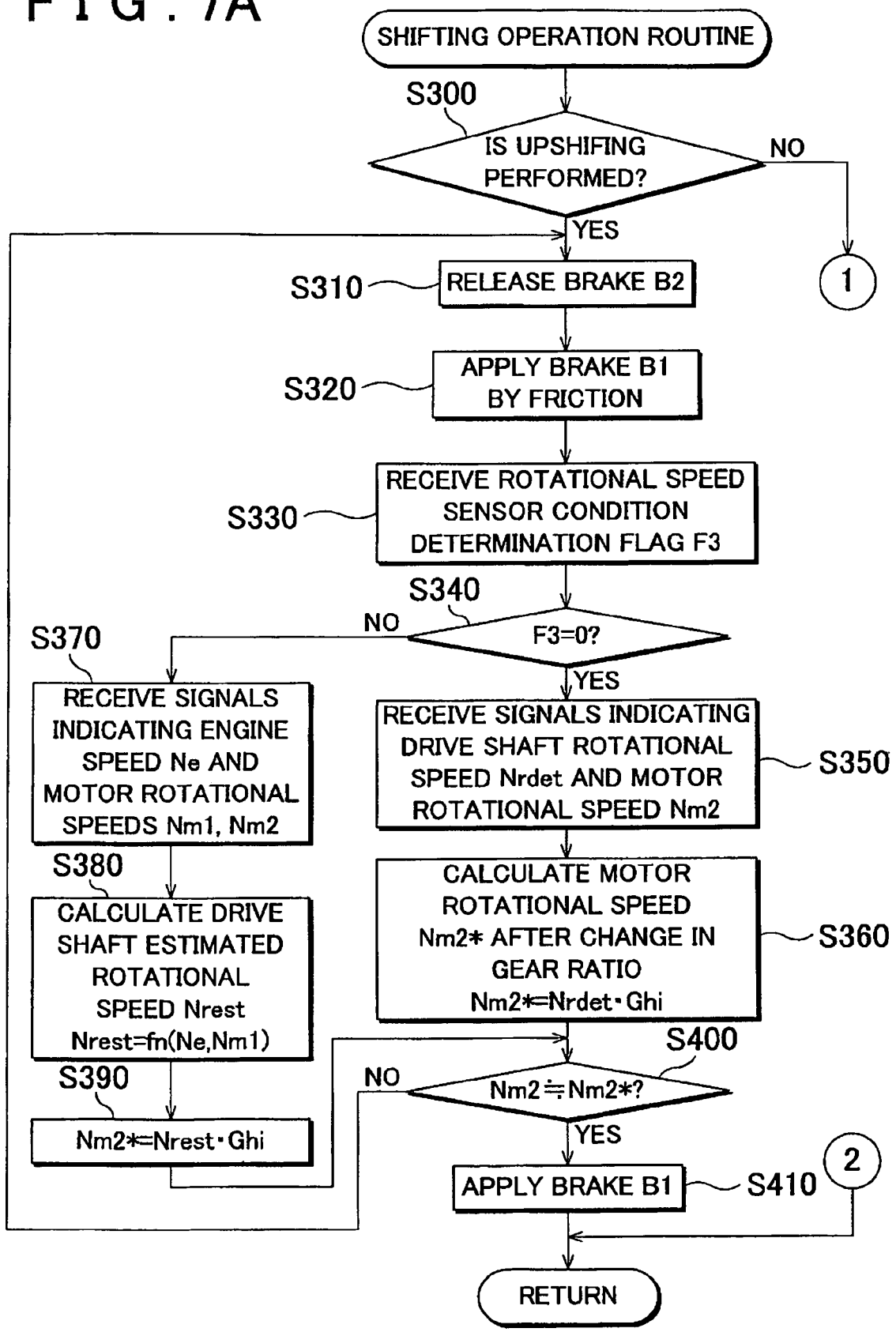
FIGS. 7A and 7B are the flowcharts showing an example of the shifting operation routine.
Figure 7B:
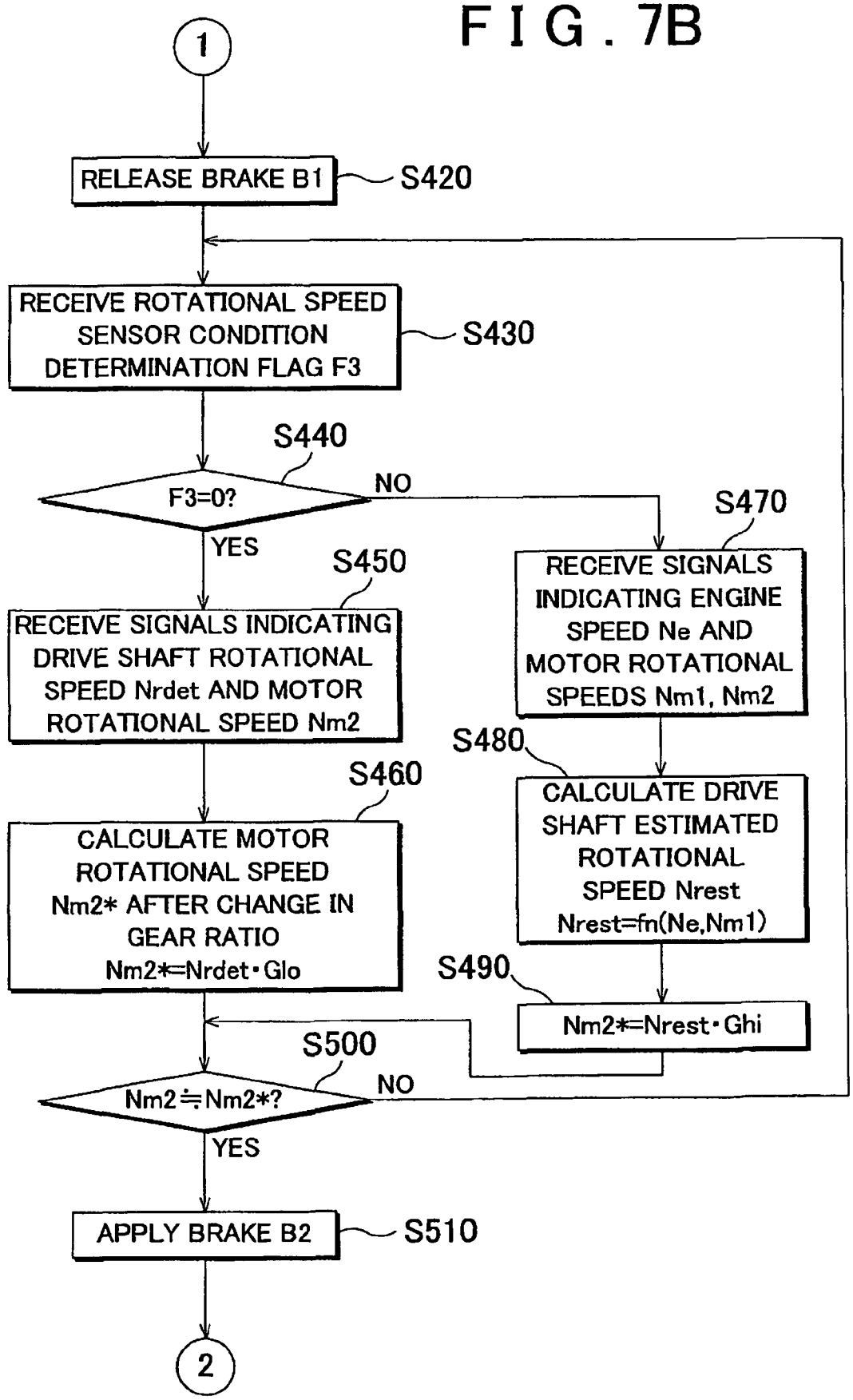

When the crank position sensor condition determination flag F1 and the rotational position sensor condition determination flag F2 both indicate "0", it is determined that the crank position sensor 23 and the rotational position sensor 43 are both operating properly and the estimated rotational speed Nrest can be calculated. Then, it is determined whether the gear ratio is being changed in the transmission 60 (step S150). If it is determined that the gear ratio is not being changed, an instruction to start the shifting operation for changing the gear ratio in the transmission 60 is issued (step S160), and steps S170 to S230 are performed, after which the drive control routine ends. On the other hand, if it is determined that the gear ratio is being changed in the transmission 60, steps S170 to S230 are performed without performing step S160, after which the drive control routine ends. When an instruction to start the shifting operation is issued, the hybrid ECU 70 starts the shifting operation routine shown in FIG. 7 while performing the drive control routine shown in FIG. 3. The description of the drive control routine in FIG. 3 will be temporarily suspended, and the shifting operation routine shown in FIG. 7 will be described below.

In the shifting operation routine, the CPU 72 of the hybrid ECU 70 determines whether upshifting or downshifting is performed (step S300). If it is determined that upshifting is performed, the brake B2 is released (step S310), and the brake B1 is applied by friction (step S320). Then, the hybrid ECU 70 receives the rotational speed sensor condition determination flag F3 (step S330), and checks the value of the received rotational sensor condition determination flag F3 (step S340). In the rotational speed sensor condition determination routine (not shown) performed by the hybrid ECU 70, it is determined whether transmission of the signals from the rotational speed sensor 36 to the hybrid ECU 70 has been stopped for a predetermined time period. If it is determined that the rotational speed sensor 36 is operating properly, the rotational speed sensor condition determination flag F3 is set to "0". On the other hand, if it is determined that a malfunction has occurred in the rotational speed sensor 36, the rotational speed sensor condition determination flag F3 is set to "1". The hybrid ECU 70 obtains the rotational speed sensor condition determination flag F3 by reading this flag written in a predetermined address in the RAM 76.

When the rotational speed sensor condition determination flag F3 indicates "0", the hybrid ECU 70 determines that the rotational speed sensor 36 is operating properly. Then, the hybrid ECU 70 receives the signal indicating the rotational speed Nm2 of the motor MG2 as in step S100 of the drive control routine in FIG. 3, and the signal indicating the detected rotational speed Nrdet of the ring gear shaft 32a, which is transmitted from the rotational speed sensor 36 (step S350). Then, the hybrid ECU calculates the rotational speed Nm2* of the motor MG2, achieved after the change in gear ratio, by multiplying the detected rotational speed Nrdet by the gear ratio Ghi at the high gear (step S360).

When the rotational speed sensor condition determination flag F3 indicates "1", it is determined that a malfunction has occurred in the rotational speed sensor 36. The hybrid ECU 70 receives the signals indicating the rotational speed Ne of the engine 22, and the rotational speeds Nm1, Nm2 of the motors MG1, MG2 (step S370), as in step S100 of the drive control routine in FIG. 3. The hybrid ECU 70 calculates the estimated rotational speed Nrest of the ring gear shaft 32a based on the rotational speed Ne of the engine 22 and the rotational speed Nm1 of the motor MG1 according to the equation (6) (step S380). Then, the hybrid ECU 70 calculates the rotational speed Nm2* of the motor MG2, achieved after the change in gear ratio, by multiplying the estimated rotational speed Nrest by the gear ratio Ghi at the high gear (step S390). The equation (6) can be easily derived from the coilinear view in FIG. 6.

It is determined whether the rotational speed Nm2 of the motor MG2 is close to the rotational speed Nm2* of the motor MG2, achieved after the change in gear ratio, which is calculated in step S360 or step S390 (step S400). If it is determined that the rotational speed Nm2 is not close to the rotational speed Nm2*, step S330 is performed again. Then steps S330 to S400 are periodically performed until it is determined that the rotational speed Nm2 is close to the rotational speed Nm2*. If it is determined in step S400 that the rotational speed Nm2 is close to the rotational speed Nm2*, the brake B1 is fully applied (step S410), after which the shifting operation routine ends. When upshifting is performed, if the rotational speed sensor 36 is operating properly, the synchronous determination as to whether the rotational speed Nm2 is close to the rotational speed Nm2*, achieved after the change in gear ratio, is made based on the detected rotational speed Nrdet of the ring gear shaft 32a, which is transmitted from the rotational speed sensor 36, and the rotational speed Nm2 of the motor MG2. On the other hand, when a malfunction has occurred in the rotational speed sensor 36, the synchronous determination is made based on the estimated rotational speed Nrest of the ring gear shaft 32a, which is obtained based on the rotational speed Ne2 of the engine 22 and the rotational speed Nm1 of the motor MG1, and the rotational speed Nm2 of the motor MG2. Thus, upshifting is performed smoothly.

After the shifting operation is thus completed, it is determined, in step S120 in the subsequent drive control routine in FIG. 3, that an instruction to change the gear ratio in the transmission 60 has not been issued.

$$Nrest = Ne \times (1+\rho) - Nm1 \times \rho \tag{6}$$

If it is determined in step S300 that downshifting is performed, the brake B1 is released (step S420). Then, the hybrid ECU 70 receives the rotational speed sensor condition determination flag F3 (step S430), and checks the value of the received rotational speed sensor condition determination flag F3 (step S440).

When the rotational speed sensor condition determination flag F3 indicates "0", it is determined that the rotational speed sensor 36 is operating properly. Then, the hybrid ECU 70 receives the signals indicating the rotational speed Nm2 of the motor MG2 and the detected rotational speed Nrdet of the ring gear shaft 32a, which is transmitted from the rotational speed sensor 36 (step S450). The hybrid ECU 70 then calculates the rotational speed Nm2* of the motor MG2, achieved after the change in gear ratio, by multiplying the detected rotational speed Nrdet by the gear ratio Glo at the low gear (step S460).

On the other hand, if the rotational speed sensor condition determination flag F3 indicates "1", the hybrid ECU 70 determines that a malfunction has occurred in the rotational speed sensor 36, and receives the signals indicating the rotational speed Ne of the engine 22 and the rotational speeds Nm1, Nm2 of the motors MG1, MG2 (step S470). Then, the hybrid ECU 70 calculates the estimated rotational speed Nrest of the ring gear shaft 32a based on the rotational speed Ne of the engine 22 and the rotational speed Nm1 of the motor MG1 according to the above-described equation (6) (step S480). Then, the hybrid ECU 70 calculates the rotational speed Nm2* of the motor MG2, achieved after the change in gear ratio, by multiplying the estimated rotational speed Nrest by the gear ratio Glo at the low gear (step S490).

Then, it is determined whether the rotational speed Nm2 of the motor MG2 is close to the rotational speed Nm2* of the motor MG2, achieved after the change in gear ratio, which is calculated in step S460 or step S490, due to the positive torque output from the motor MG2 (step S500). If it is determined that the rotational speed Nm2 is not close to the rotational speed Nm2*, step S430 is performed again. Then, steps S430 to S500 are periodically performed until it is determined that the rotational speed Nm2 is close to the rotational speed Nm2*. If it is determined that the rotational speed Nm2 is close to the rotational speed Nm2*, the brake B2 is applied (step S510), after which the shifting operation routine ends. When downshifting is performed, if it is determined that the rotational speed sensor 36 is operating properly, the synchronous determination as to whether the rotational speed Nm2 is close to the rotational speed Nm2*, achieved after the change in gear ratio, is made based on the detected rotational speed Nrdet of the ring gear shaft 32a, which is transmitted from the rotational speed sensor 36, and the rotational speed Nm2 of the motor MG2. On the other hand, if it is determined that a malfunction has occurred in the rotational speed sensor 36, the synchronous determination is made based on the estimated rotational speed Nrest of the ring gear shaft 32a, which is obtained based on the rotational speed Ne of the engine 22 and the rotational speed Nm1 of the motor MG1, and the rotational speed Nm2 of the motor MG2. Thus, downshifting is performed smoothly.

After the shifting operation is thus completed, it is determined, in step S130 in the subsequent drive control routine in FIG. 3, that an instruction to change the gear of the transmission 60 has not been issued.

Hereafter, the drive control routine in FIG. 3 will be described again. If it is determined in step S130 that the crank position sensor condition determination flag F1 indicates "1", it is determined that a malfunction has occurred in the crank position sensor 23. In this case, steps S170 to S230 are performed without issuing an instruction to start the shifting operation for the transmission 60, after which the drive control routine ends. If it is determined in step S140 that the rotational position sensor condition determination flag F2 indicates "1", it is determined that a malfunction has occurred in the rotational position sensor 43. Then, the hybrid ECU 70 calculates the rotational speed of the motor MG1 based on the rotational speed Ne of the engine 22 and the rotational speed (V×k) of the ring gear shaft 32a according to the equation (7) (hereinafter, such rotational speed will be referred to as the "estimated rotational speed Nm1est) without issuing an instruction to start the shifting operation for the transmission 60 (step S240). The hybrid ECU 70 then sets the rotational speed Nm1 of the motor MG1 to the estimated rotational speed Nm1est (step S250), and performs steps S170 to S230, after which the drive control routine ends. The estimated rotational speed Nm1est is calculated and the rotational speed Nm1 of the motor MG1 is set to the estimated rotational speed Nm1est when the rotational position sensor condition determination flag F2 indicates "1", because the rotational speed Nm1 of the motor MG1, which will be used in steps S180, S190, is not received by the hybrid ECU 70 in step S100.

The equation (7) can be easily derived from the collinear view in FIG. 6. When at least one of the crank position sensor condition determination flag F1 and the rotational position sensor condition determination flag F2 indicates "1", it is determined that a malfunction has occurred in at least one of the crank position sensor 23 and the rotational position sensor 43. In this case, the gear ratio is not changed in the transmission 60.

If a malfunction has occurred in at least on of the crank position sensor 23 and the rotational position sensor 43, the estimated rotational speed Nrest of the ring gear shaft 32a cannot be calculated based on the rotational speed Ne of the engine 22 and the rotational speed Nm1 of the motor MG1. As described above, when the shifting operation for the transmission 60 is performed, if the rotational speed sensor 36 is operating properly, the synchronous determination is made based on the detected rotational speed Nrdet of the ring gear shaft 32a and the rotational speed Nm2 of the motor MG2. On the other hand, if a malfunction has occurred in the rotational speed sensor 36, the synchronous determination is made based on the estimated rotational speed Nrest and the rotational speed Nm2 of the motor MG2. Therefore, if the shifting operation for the transmission 60 is performed in the state where the estimated rotational speed Nrest cannot be calculated, when a malfunction occurs in the rotational speed sensor 36 during the change in gear ratio, the synchronous determination cannot be made based on the rotational speed Nm2 of the motor MG2 and the rotational speed of the ring gear shaft 32a (the detected rotational speed Nedet or the estimated rotational speed Nrest). Accordingly, the shifting operation for the transmission 60 cannot be performed smoothly. As a result, one of the brakes B1, B2 is rapidly applied, which may wear out the components of the transmission 60 such as the brakes B1, B2 or impart a shock to the vehicle.

The gear of the transmission 60 is maintained, namely, the shifting operation is not performed, when a malfunction has occurred in at least one of the crank position sensor 23 and the rotational position sensor 43. As a result, occurrence of the above-mentioned inconvenience is suppressed.

$$Nm1est = Ne \times (1+\rho)/\rho - V \times k/\rho \quad (7)$$

In the hybrid vehicle 20 according to the embodiment of the invention described so far, when the estimated rotational speed Nrest cannot be calculated because a malfunction has occurred in at least one of the crank position sensor 23 and the rotational position sensor 43, the gear ratio is not changed in the transmission 60. If the gear ratio is changed in the transmission 60 when the estimated rotational speed Nrest cannot be calculated, the synchronous determination cannot be performed appropriately if a malfunction occurs in the rotational speed sensor 36 during the change in gear ratio and the detected rotational speed Nrdet of the ring gear shaft 32a cannot be detected. As a result, the components of the transmission 60 such as the brakes B1, B2 may wear out or a shock may be imparted to the vehicle. However, occurrence of such inconvenience can be suppressed because the gear ratio is not changed in the transmission 60 if the estimated rotational speed Nrest cannot be calculated.

In the hybrid vehicle 20 according to the embodiment of the invention, whether the estimated rotational speed Nrest of the ring gear shaft 32a can be calculated is determined based on the conditions of the crank position sensor 23 and the rotational position sensor 43. Alternatively, such a determination may be made based on only one of the conditions of the crank position sensor 23 and the rotational position sensor 43.

In the hybrid vehicle 20 according to the embodiment of the invention, when an instruction to change the gear ratio in the transmission 60 has been issued, if the crank position sensor 23 and the rotational position sensor 43 are both operating properly, the gear ratio is changed in the transmission 60 based on the detected rotational speed Nrdet or the estimated rotational speed Nrest of the ring gear shaft 32a and the rotational speed Nm2 of the motor MG2, regardless of the condition of the rotational speed sensor 36. When it is determined, before the change in gear ratio is started, that a malfunction has occurred in the rotational speed sensor 36, the gear ratio is not changed in the transmission 60. If the change in gear ratio is started when a malfunction has occurred in the rotational speed sensor 36, the gear ratio is changed in the transmission 60 based on the estimated rotational speed Nrest and the speed Nm2 of the motor MG2 from the start of the change in gear ratio. Accordingly, if it becomes impossible to calculate the estimated rotational speed Nrest during the change in gear ratio, neither the detected rotational speed Nrdet nor the estimated rotational speed Nrest can be used, and the synchronous determination cannot be made appropriately. As a result, the components of the transmission 60 such as the brakes B1, B2 may wear out or a shock may be imparted to the vehicle. However, such inconvenience can be suppressed, because the gear ratio is not changed if it is determined, before the change in gear ratio is started, that a malfunction has occurred.

In this case as well, if a malfunction occurs in the rotational speed sensor 36 after the change in gear ratio is started, the gear ratio is changed in the transmission 60 based on the estimated rotational speed Nrest and the speed Nm2 of the motor MG2, as in the embodiment of the invention described above.

In the hybrid vehicle 20 according to the embodiment of the invention, the transmission 60 of which the gear is changed between the high gear and the low gear is used. However, the number of the gears of the transmission 60 is not limited to two. A transmission having three or more gears may be used.

Figure 8:
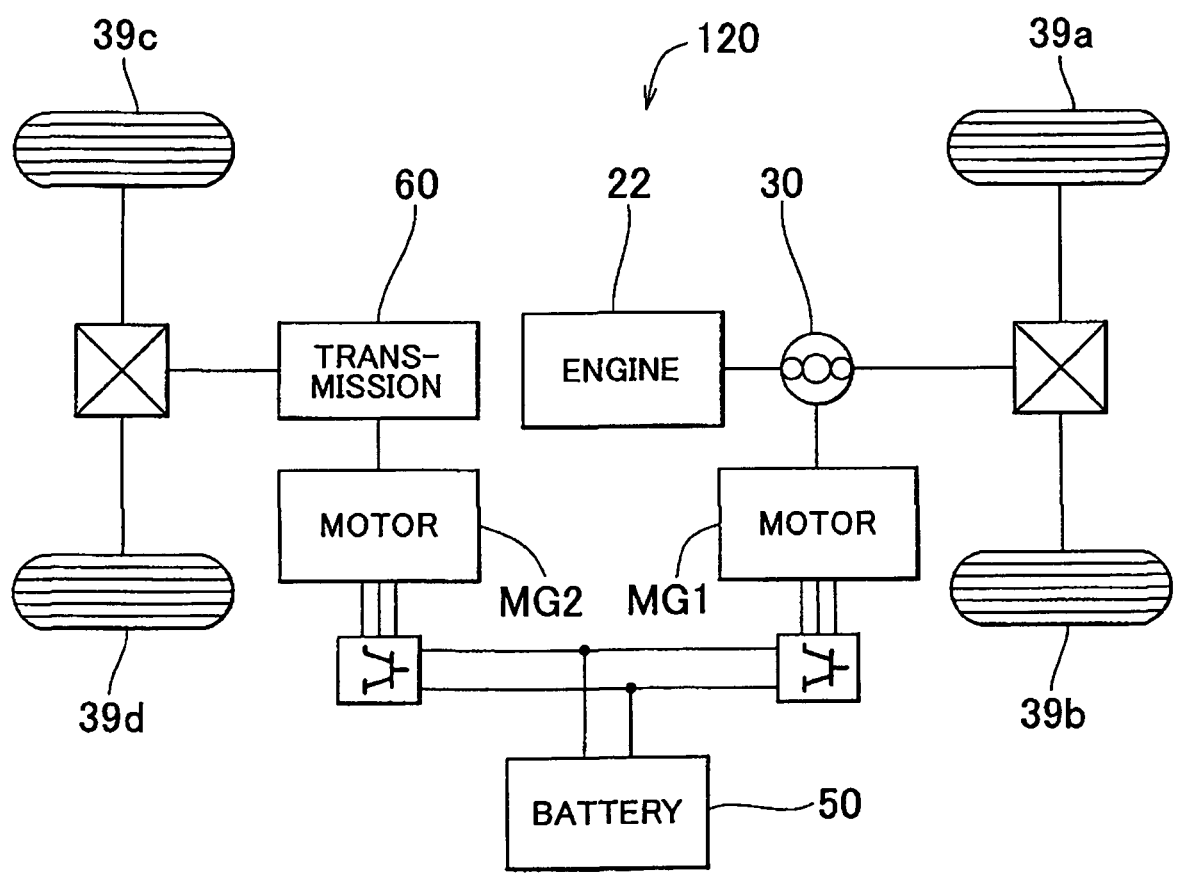
FIG. 8 is the view schematically showing the structure of a hybrid vehicle 120 according to a modified example of the embodiment of the invention.
Figure 9:
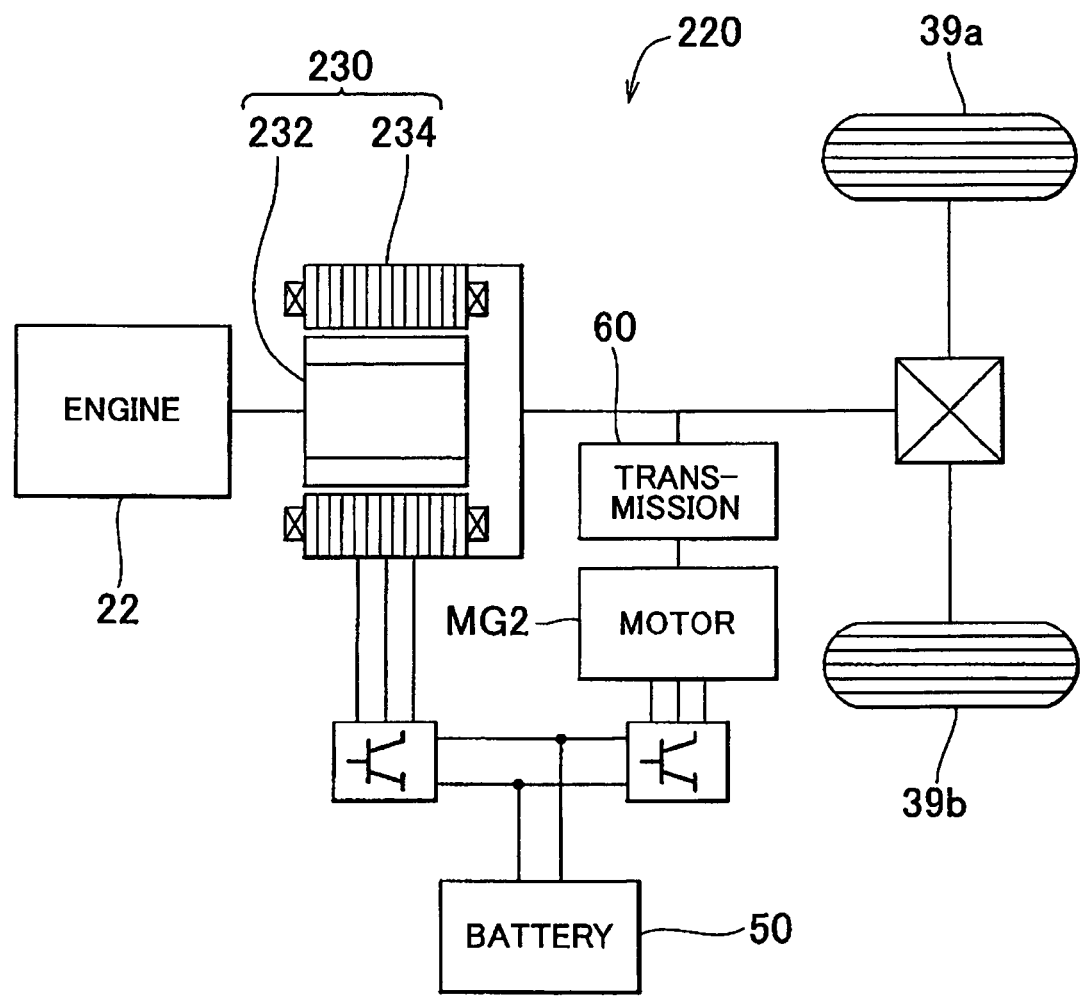
FIG. 9 is the view schematically showing the structure of a hybrid vehicle 220 according to another modified example of the embodiment of the invention.

In the hybrid vehicle 20 according to the embodiment of the invention, the power from the motor MG2 is output to the ring gear shaft 32*a* while the rotational speed of the motor MG2 is reduced by a reduction gear 35. Alternatively, as shown in a hybrid vehicle 120 according to a modified example of the embodiment shown in FIG. 8, the power from the motor MG2 may be output to an axle (the axle connected to wheels 39*c*, 39*d* in FIG. 8) other than the axle (the axle connected to the drive wheels 39*a*, 39*b*) to which the ring gear shaft 32*a* is connected.

In the hybrid vehicle 20 according to the embodiment of the invention, the power from the engine 22 is output, via the power split/integration mechanism 30, to the ring gear shaft 32*a* connected to the drive wheels 39*a*, 39*b*. Alternatively, as shown in a hybrid vehicle 220 according to another modified example of the embodiment of the invention, a rotor electric motor 230 may be provided. The rotor electric motor 230 includes an inner rotor 232 connected to the crankshaft 26 of the engine 22 and an outer rotor 234 connected to the drive shaft that outputs the power to the drive wheels 39*a*, 39*b*. The rotor electric motor 230 outputs part of the power from the engine to the drive shaft and converts the remaining power to the electric power.

In the embodiment of the invention described above, the power output apparatus is mounted the hybrid vehicle. However, such power output apparatus may be mounted in movable bodies other than vehicles, such as vessels, and aircrafts, or immovable equipment such as construction equipment. Also, the invention may be applied to a power output apparatus, a control device for a power output apparatus, or a control method for a power output apparatus.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A power output apparatus that outputs power to a drive shaft, comprising:
    an internal combustion engine;
    a storage portion;
    a first electric motor that receives and outputs power, and that exchanges electric power with the storage portion;
    a power split device that is connected to an output shaft of the internal combustion engine and the drive shaft, and that receives power from the output shaft and outputs the power to the drive shaft or receives power from the drive shaft and outputs the power to the output shaft while exchanging electric power with the storage portion and exchanging power with the internal combustion engine;
    a shifting portion that transfers power between a rotating shaft of the first electric motor and the drive shaft while changing a speed ratio based on a rotational speed of the rotating shaft of the first electric motor and a rotational speed of the drive shaft;
    an engine speed detection portion that detects an engine speed that is a rotational speed of the output shaft of the internal combustion engine;
    a drive shaft rotational speed detection portion that detects the rotational speed of the drive shaft;
    a rotating shaft rotational speed detection portion that detects the rotational speed of the rotating shaft of the first electric motor;
    a drive shaft rotational speed estimation portion that estimates the rotational speed of the drive shaft based on the engine speed detected by the engine speed detection portion and a driving state of the power split device;
    a required drive power setting portion that sets a required drive power required for the drive shaft; and
    a control portion that controls the internal combustion engine, the power split device, the first electric motor, and the shifting portion to output the required drive power to the drive shaft, wherein
    the speed ratio in the shifting portion is changed, based on the rotational speed of the drive shaft detected by the drive shaft rotational speed detection portion or the rotational speed of the drive shaft estimated by the drive shaft rotational speed estimation portion, and the rotational speed of the rotating shaft detected by the rotating shaft rotational speed detection portion, when an estimation function of the drive shaft rotational speed; and is performed properly, that is when the drive shaft rotational speed estimation portion can estimate the rotational speed of the drive shaft; and
    the speed ratio in the shifting portion is maintained, when a malfunction has occurred in the estimation function, that is when the drive shaft rotational speed estimation portion cannot estimate the rotational speed of the drive shaft.

2. The power output apparatus according to claim 1, wherein,
    the speed ratio in the shifting portion is changed based on the rotational speed of the rotating shaft, detected by the rotating shaft rotational speed detection portion and the rotational speed of the drive shaft, detected by the drive shaft rotational speed detection portion, when a malfunction has not occurred in the drive shaft rotational speed detection portion, and
    the speed ratio in the shifting portion is changed based on the rotational speed of the rotating shaft, detected by the rotating shaft rotational speed detection portion and the rotational speed of the drive shaft, estimated by the drive shaft rotational speed estimation portion, when a malfunction has occurred in the drive shaft rotational speed detection portion.

3. The power output apparatus according to claim 1, wherein,
    when a malfunction has occurred in the engine speed detection portion, the control portion determines that a malfunction has occurred in the estimation function, and performs control so that the speed ratio is not changed in the shifting portion.

4. The power output apparatus according to claim 1, wherein,
    when the driving state of the power split device cannot be detected, the control portion determines that a malfunction has occurred in the estimation function, and performs control so that the speed ratio is not changed in the shifting portion.

5. The power output apparatus according to claim 4, wherein
the power split device includes a three-axis power reception/output portion that is connected to three shafts that are the output shaft of the internal combustion engine, the drive shaft, and a third shaft, and that receives or outputs, based on power received from and/or output to any two of the three shafts, power from or to the remaining shaft; a second electric motor that receives power from or outputs power to the third shaft; and a third shaft rotational speed detection portion that detects a rotational speed of the third shaft, and,
when a malfunction has occurred in the third shaft rotational speed detection portion, the control portion determines that a malfunction has occurred in the estimation function, and performs control so that the speed ratio is not changed in the shifting portion.

6. A vehicle provided with the power output apparatus according to claim 1, wherein an axle is connected to the drive shaft.

7. A control unit for a power output apparatus that includes an internal combustion engine; a storage portion; an electric motor that receives and outputs power, and that exchanges electric power with the storage portion; a power split device that is connected to an output shaft of the internal combustion engine and the drive shaft, and that receives power from the output shaft and outputs the power to the drive shaft or receives power from the drive shaft and outputs the power to the output shaft while exchanging electric power with the storage portion and exchanging power with the internal combustion engine; a shifting portion that transfers power between a rotating shaft of the electric motor and the drive shaft while changing a speed ratio based on a rotational speed of the rotating shaft of the electric motor and a rotational speed of the drive shaft; an engine speed detection portion that detects an engine speed that is a rotational speed of the output shaft of the internal combustion engine; a drive shaft rotational speed detection portion that detects the rotational speed of the drive shaft; and a rotating shaft rotational speed detection portion that detects the rotational speed of the rotating shaft of the electric motor, comprising:
a drive shaft rotational speed estimation portion that estimates the rotational speed of the drive shaft based on the engine speed detected by the engine speed detection portion and a driving state of the power split device;
a required drive power setting portion that sets a required drive power required for the drive shaft; and
a control portion that controls the internal combustion engine, the power split device, the electric motor, and the shifting portion to output the required drive power to the drive shaft, wherein
the speed ratio in the shifting portion is changed, based on the rotational speed of the drive shaft detected by the drive shaft rotational speed detection portion or the rotational speed of the drive shaft estimated by the drive shaft rotational speed estimation portion, and the rotational speed of the rotating shaft detected by the rotating shaft rotational speed detection portion, when an estimation function is performed properly, that is when the drive shaft rotational speed estimation portion can estimate the rotational speed of the drive shaft, and
the speed ratio in the shifting portion is maintained, when a malfunction has occurred in the estimation function, that is when the drive shaft rotational speed estimation portion cannot estimate the rotational speed of the drive shaft.

8. A control method for a power output apparatus that includes an internal combustion engine; a storage portion; an electric motor that receives and outputs power, and that exchanges electric power with the storage portion; a power split device that is connected to an output shaft of the internal combustion engine and the drive shaft, and that receives power from the output shaft and outputs the power to the drive shaft or receives power from the drive shaft and outputs the power to the output shaft while exchanging electric power with the storage portion and exchanging power with the internal combustion engine; a shifting portion that transfers power between a rotating shaft of the electric motor and the drive shaft while changing a speed ratio based on a rotational speed of the rotating shaft of the electric motor and a rotational speed of the drive shaft; an engine speed detection portion that detects an engine speed that is a rotational speed of the output shaft of the internal combustion engine; a drive shaft rotational speed detection portion that detects the rotational speed of the drive shaft; and a rotating shaft rotational speed detection portion that detects the rotational speed of the rotating shaft of the electric motor, comprising:
estimating the rotational speed of the drive shaft based on the engine speed detected by the engine speed detection portion and a driving state of the power split device;
setting a required drive power required for the drive shaft;
controlling the internal combustion engine, the power split device, the electric motor, and the shifting portion to output the required drive power to the drive shaft, while changing the speed ratio in the shifting portion, based on the rotational speed of the drive shaft detected by the drive shaft rotational speed detection portion or the estimated rotational speed of the drive shaft, and the rotational speed of the rotating shaft detected by the rotating shaft rotational speed detection portion, when an estimation function is performed properly, that is when the rotational speed of the drive shaft can be estimated, and
controlling the internal combustion engine, the power split device, the electric motor, and the shifting portion to output the required drive power to the drive shaft, while maintaining the speed ratio in the shifting portion, when a malfunction has occurred in the estimation function, that is when the rotational speed of the drive shaft cannot be estimated.

* * * * *